United States Patent
Arguelles et al.

(10) Patent No.: US 11,198,630 B2
(45) Date of Patent: Dec. 14, 2021

(54) MODULAR WATER PURIFICATION SYSTEM FOR NUCLEAR POWER PLANTS

(71) Applicant: DOMINION ENGINEERING, INC., Reston, VA (US)

(72) Inventors: David Arguelles, Herndon, VA (US); Michael J. Little, Ashburn, VA (US); Robert D. Varrin, Jr., Reston, VA (US)

(73) Assignee: Dominion Engineering, Inc., Reston, VA (US)

( * ) Notice: Subject to any disclaimer, the term of this patent is extended or adjusted under 35 U.S.C. 154(b) by 281 days.

(21) Appl. No.: 16/493,884

(22) PCT Filed: Apr. 19, 2018

(86) PCT No.: PCT/US2018/028286
§ 371 (c)(1),
(2) Date: Sep. 13, 2019

(87) PCT Pub. No.: WO2018/195265
PCT Pub. Date: Oct. 25, 2018

(65) Prior Publication Data
US 2021/0122653 A1    Apr. 29, 2021

Related U.S. Application Data

(60) Provisional application No. 62/487,702, filed on Apr. 20, 2017.

(51) Int. Cl.
*C02F 9/00* (2006.01)
*C02F 1/00* (2006.01)
(Continued)

(52) U.S. Cl.
CPC ............... *C02F 9/00* (2013.01); *C02F 1/001* (2013.01); *C02F 1/20* (2013.01); *C02F 1/32* (2013.01);
(Continued)

(58) Field of Classification Search
None
See application file for complete search history.

(56) References Cited

U.S. PATENT DOCUMENTS 3,700,550 A * 10/1972 Shiells ................ G21C 19/307
376/313
3,962,078 A * 6/1976 Hirs ....................... B01D 29/09
210/665
(Continued)

FOREIGN PATENT DOCUMENTS

FR            3000277 A1    6/2014
WO       2015109182 A1    7/2015

OTHER PUBLICATIONS

Written Opinion of the International Preliminary Examining Authority dated Mar. 19, 2019 in related International Patent Application No. PCT/US2018/028286, 8 pages.
(Continued)

*Primary Examiner* — Chester T Barry
(74) *Attorney, Agent, or Firm* — Pillsbury Winthrop Shaw Pittman LLP

(57) ABSTRACT

A modular water purification system for a nuclear power plant includes a plurality of modules that may be selectively connected together directly or through the use of intermediary adapters in a plurality of arrangements. The modules may include a pump module, a FOSAR module, a particulate filtration module, a cross-flow filtration module, a degasification module, and/or a demineralization module, among other possible modules. The modules may have common interfaces so that they can be interconnected (directly or through intermediary adapters) in a variety of configurations for different purposes within the context of the nuclear power plant (e.g., filtering pool water; collecting large objects via vacuuming). Various modules may have form factors and/or mounting structures that are similar enough to the fuel assemblies of the plant that (1) the plant's fuel assembly handling equipment can grab, move, and reposition the modules, and/or (2) the modules may be stored in the fuel pool's storage rack.

29 Claims, 9 Drawing Sheets

(51) Int. Cl.
*C02F 1/20* (2006.01)
*C02F 1/32* (2006.01)
*C02F 1/36* (2006.01)
*C02F 1/38* (2006.01)
*C02F 1/42* (2006.01)
*C02F 1/463* (2006.01)
*F04D 7/08* (2006.01)
*F04D 29/22* (2006.01)
*G21C 3/33* (2006.01)
*G21C 3/334* (2006.01)
*G21C 19/07* (2006.01)
*G21C 19/307* (2006.01)
*C02F 101/00* (2006.01)

(52) U.S. Cl.
CPC ............... *C02F 1/36* (2013.01); *C02F 1/38* (2013.01); *C02F 1/42* (2013.01); *C02F 1/463* (2013.01); *F04D 7/08* (2013.01); *F04D 29/2266* (2013.01); *G21C 3/334* (2013.01); *G21C 3/3305* (2013.01); *G21C 19/07* (2013.01); *G21C 19/307* (2013.01); *C02F 2101/006* (2013.01); *C02F 2201/004* (2013.01); *C02F 2201/007* (2013.01); *C02F 2303/22* (2013.01); *C02F 2303/24* (2013.01)

(56) References Cited

U.S. PATENT DOCUMENTS

| | | | | |
|---|---|---|---|---|
| 4,053,359 A * | 10/1977 | Pennell | ............... | G21C 1/024 376/365 |
| 4,096,032 A * | 6/1978 | Mayers | ............... | G21C 17/00 376/313 |
| 4,511,500 A | 4/1985 | Guilloteau | | |
| 4,828,691 A * | 5/1989 | Abbott | ............... | C02F 9/005 210/109 |
| 4,900,507 A * | 2/1990 | Shallenberger | ...... | G21C 3/3206 376/352 |
| 5,479,461 A * | 12/1995 | Kilian | ............... | G21C 3/3206 376/313 |
| 6,197,188 B1 * | 3/2001 | Lamoureux | ............ | B01D 36/02 210/138 |
| 6,352,645 B1 * | 3/2002 | Wilfong | ............... | B01D 29/15 210/767 |
| 8,052,879 B2 * | 11/2011 | Gross | ............... | B01D 29/23 210/791 |
| 8,148,594 B2 | 4/2012 | Denton et al. | | |
| 9,767,927 B2 * | 9/2017 | Varrin, Jr. | ............ | G21C 19/307 |
| 10,699,815 B2 * | 6/2020 | Nishimura | ............ | G21C 13/036 |
| 2002/0122525 A1 | 9/2002 | Rosenberger et al. | | |
| 2005/0098492 A1 * | 5/2005 | Harrison | ............... | B01D 35/301 210/252 |
| 2005/0121379 A1 * | 6/2005 | Strohm | ............... | B01D 25/26 210/284 |
| 2009/0252275 A1 | 10/2009 | Hussey et al. | | |
| 2011/0170651 A1 * | 7/2011 | Knabe | ............... | G21C 3/3206 376/313 |
| 2017/0050865 A1 | 2/2017 | Denton et al. | | |
| 2020/0103051 A1 * | 4/2020 | Clunie | ............... | E21B 41/04 |
| 2021/0210221 A1 * | 7/2021 | Singh | ............... | G21C 7/12 |

OTHER PUBLICATIONS

International Search Report and Written Opinion of the International Searching Authority dated Aug. 23, 2018 in related International Patent Application No. PCT/US2018/028286, 19 pages.

Invitation to Pay Additional Fees and, Where Applicable, Protest Fee issued on Jun. 26, 2018 in related International Patent Application No. PCT/US2018/028286, 17 pages.

* cited by examiner

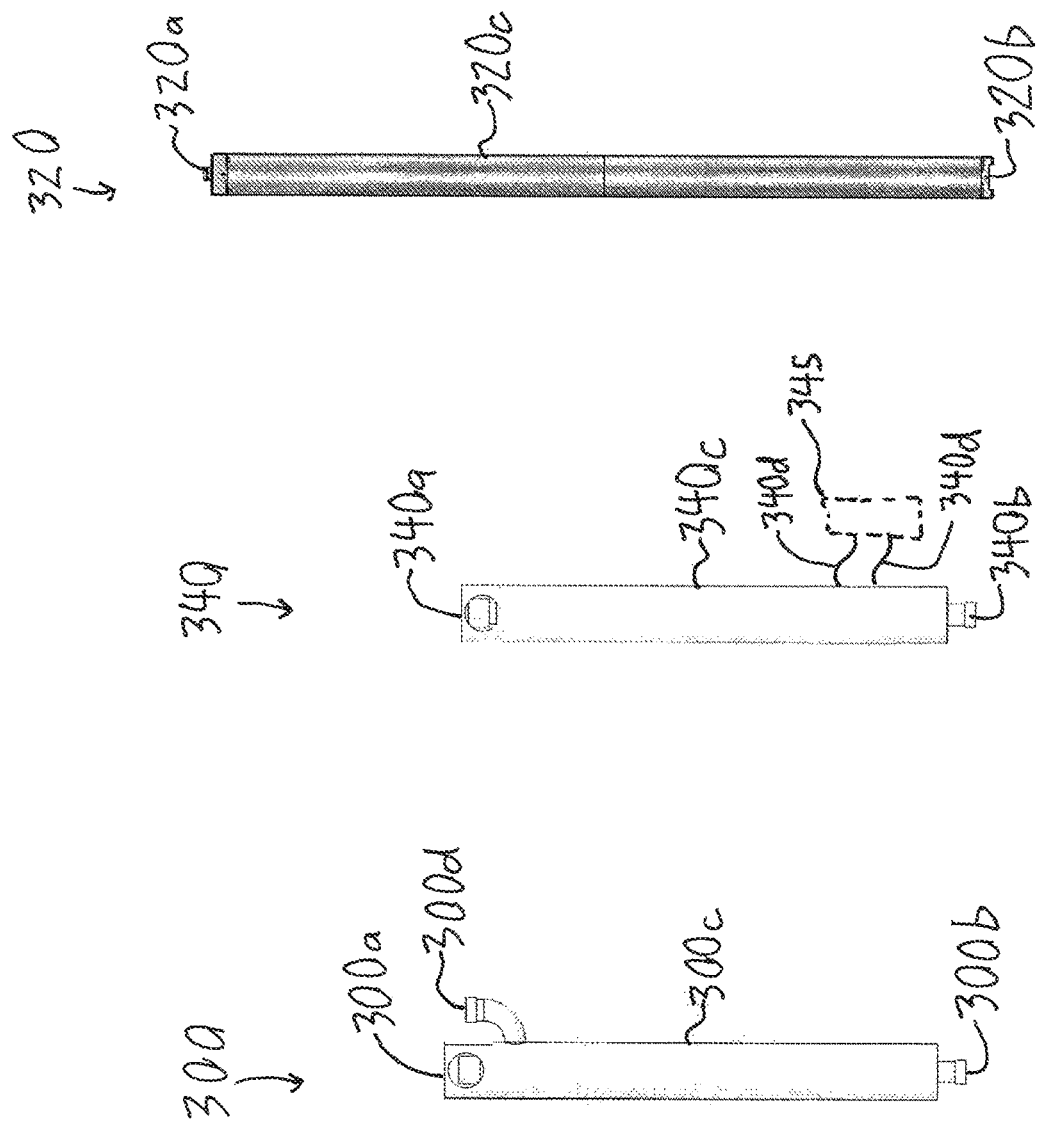
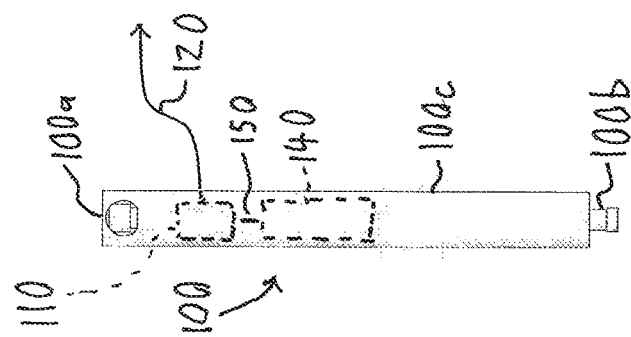

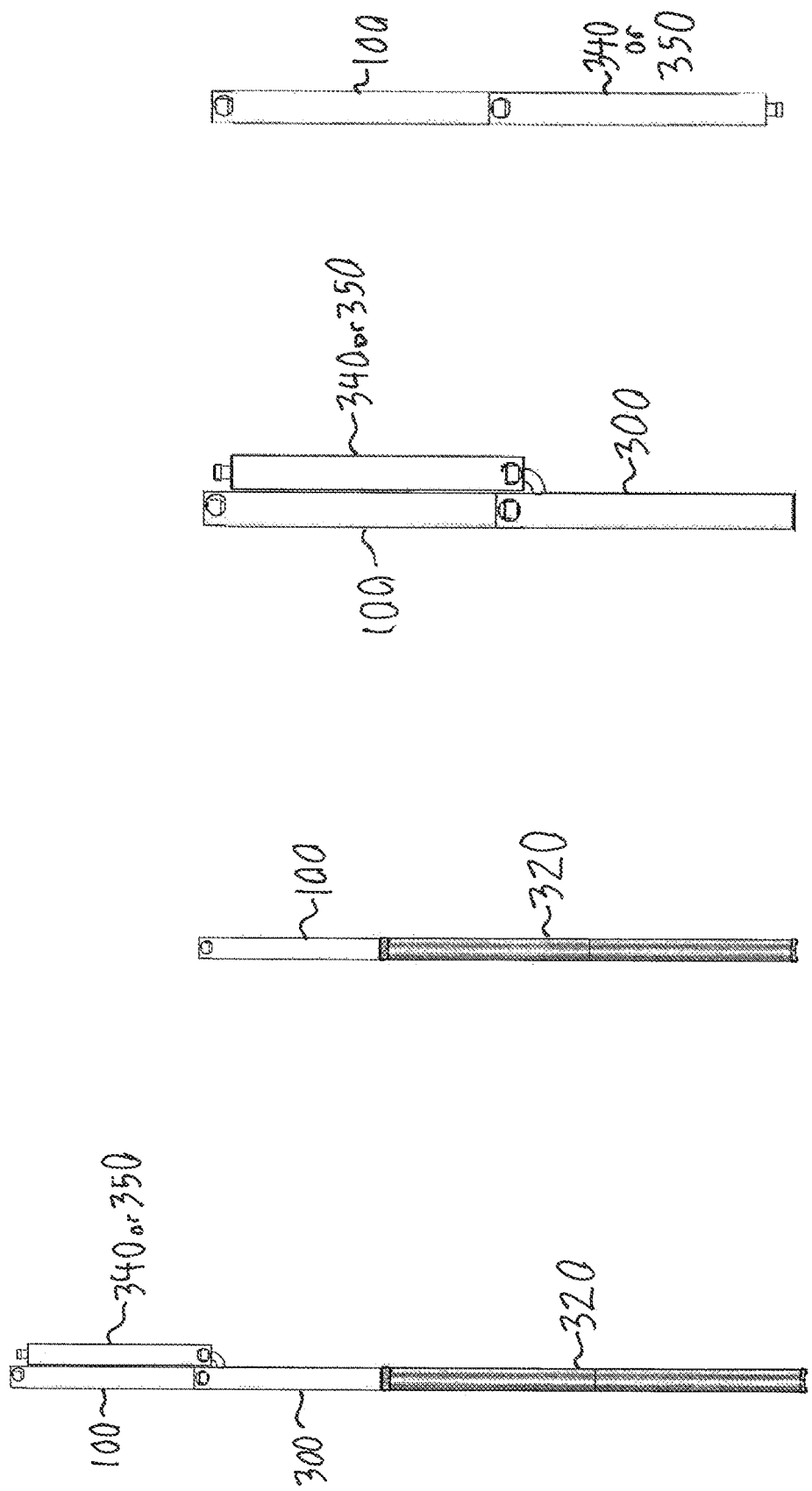

MODULAR WATER PURIFICATION SYSTEM FOR NUCLEAR POWER PLANTS

CROSS-REFERENCE TO RELATED APPLICATIONS

This application is a National Stage of PCT/US2018/028286, filed Apr. 19, 2018, titled "Modular Water Purification System for Nuclear Power Plants," which claims the benefit of priority from U.S. Provisional Application No. 62/487,702, filed Apr. 20, 2017, titled "Modular Water Purification System for Nuclear Power Plants," the entire contents of the aforementioned applications are hereby incorporated by reference herein.

BACKGROUND

1. Field of the Invention

Various embodiments relate generally to water purification systems used in nuclear power plants.

2. Description of Related Art

Contaminants in water at nuclear power plants (e.g., PWR, BWR and CANDU), particularly in spent fuel pools, reactor vessels and reactor cavities, can cause water clarity issues that hinder the efficiency of normal maintenance activities, increase radiation exposure to workers, decrease reliability of plant equipment, and/or challenge chemistry control. These contaminants may include ionic, colloidal and particulate corrosion products, silica, radioactive and non-radioactive gases, machining debris, and/or biological species.

SUMMARY

One or more non-limiting embodiments provide a modular purification system that facilitates efficient removal of one or more contaminants. The system is modular and can be used with one or more purification modules, each of which may be configured in a convenient form factor that leverages existing plant infrastructure for handling and storing purification equipment and simplifies radioactive waste management.

One or more non-limiting embodiments facilitate improved purification of water at nuclear power plants (PWRs, BWRs and CANDU), for example in spent fuel pools, reactor vessels and/or reactor cavities, for example, via:

i) reduced radiation exposure during maintenance activities performed in and around spent fuel pools and reactor cavities through removal of activated corrosion products (ionic, colloidal and particulate);
ii) improved water clarity and worker efficiency due to removal of silica, corrosion products, gases/nanobubbles and other contaminants;
iii) reduced spread of contamination through removal of activated corrosion product particulate;
iv) improved equipment reliability through removal of foreign objects;
v) reduced risk of internal exposure due to inhalation of radioactive gases or other airborne contamination, including improved safety following fuel leaks; and/or
vi) improved equipment design to reduce the effort required to purify spent fuel and reactor cavity water and to better manage radioactive waste (e.g., solid and gaseous contaminants) collected/generated during water purification.

One or more non-limiting embodiments provide a modular water purification system for a nuclear power plant. The system includes: a plurality of modules that may be selectively connected together in a plurality of arrangements. The plurality of modules include: a pump module that includes an inlet and an outlet, and is configured to provide a fluid flow; and at least two purification modules configured to be interchangeably or simultaneously connected to the pump module.

According to one or more of these embodiments, the at least two purification modules include a FOSAR module configured to trap objects larger than 2.5 mm in diameter in a receptacle of the FOSAR module, and the FOSAR module includes an outlet that is configured to be attached to the inlet of the pump module. According to one or more of these embodiments, the receptacle is selectively detachable from a remainder of the FOSAR module so that objects in the receptacle can be examined. According to one or more of these embodiments, the FOSAR module is configured to trap objects larger than 1.0 mm in diameter in the receptacle.

According to one or more of these embodiments, the at least two purification modules include a particulate filtration module with filter media that is configured to trap particulates from a flow of fluid through the particulate filtrations module. The particulate filtration module has an inlet that is configured to connect to the outlet of the pump module. According to one or more of these embodiments, the filter media is radiation tolerant.

According to one or more of these embodiments, the at least two purification modules include an electrocoagulation module configured to be positioned upstream from the particulate filtration module so as to coagulate contaminants flowing through the electrocoagulation module before reaching the particulate filtration module and thereby facilitate improved collection of such contaminants by the particulate filtration module.

According to one or more of these embodiments, the at least two purification modules include a demineralization module that includes resin and is configured to trap ionic corrosion products from a flow of fluid through the demineralization module. According to one or more of these embodiments, the demineralization module includes a fluid outlet that is configured to connect to a solid waste processing system of a nuclear power plant such that spent resin from the demineralization module may be sluiced from the demineralization module to the solid waste processing system.

According to one or more of these embodiments, the at least two purification modules include a degasification module that includes an extracted gas outlet and is configured to extract gas from a flow of fluid through the degasification module. According to one or more of these embodiments, the degasification module is configured to connect to a vacuum pump and a gas waste processing system of the nuclear plant gas so that gas extracted by the degasification module may be handled by the plant's gas waste processing system.

According to one or more of these embodiments, the at least two purification modules includes a peroxide monitoring and injection module that is configured to discourage the release of corrosion products from fuel assemblies during defueling and refueling activities.

According to one or more of these embodiments, the at least two purification modules includes a cross-flow filtration module that is configured to separate a fluid flow through the cross-flow-filtration module into (1) a relatively cleaner flow of water that exits the cross-flow filtration module via a first outlet, and (2) a relatively dirtier flow that exits the cross-flow filtration module via a second outlet. According to one or more of these embodiments, the particulate filtration module has an inlet that is configured to alternatively connect to the outlet of the pump module or the second outlet of the cross-flow filtration module.

According to one or more of these embodiments, the at least two purification modules includes a degasification module that includes an extracted gas outlet, and the degasification module includes a fluid inlet that is configured to be connected to the first outlet of the cross-flow filtration module. According to one or more of these embodiments, the extracted gas outlet is configured to connect to a vacuum pump and a gas waste processing system of the nuclear plant gas so that gas extracted by the degasification module may be handled by the plant's gas waste processing system.

According to one or more of these embodiments, the at least two purification modules include first and second purification modules, wherein the first and second purification modules include, respectively, different types of the above-mentioned purification modules (e.g., a FOSAR module; a particulate filtration module; an electrocoagulation module; a demineralization module; a degasification module; a peroxide monitoring and injection module; or a cross-flow filtration module). According to one or more of these embodiments, the at least two purification modules includes a third purification module that is selected from the purification modules listed above and is different than the first and second purification modules. According to one or more of these embodiments, the at least two purification modules includes a fourth purification module that is selected from the purification modules listed above and is different than the first, second, and third purification modules.

According to one or more of these embodiments, an inlet or an outlet of a plurality of the modules includes a standardized connector to facilitate connection of at least a plurality of the modules to each other in the plurality of arrangements. According to one or more of these embodiments, the inlets and outlets of a plurality of the modules include air-operated radial seals that are configured to discourage contaminants within their respective module from escaping when the module is disconnected from another module.

According to one or more of these embodiments, the system includes at least one intermediary adapter that interconnects an inlet of at least one of the plurality of modules with an outlet of at least one other of the plurality of modules. Such adapters may be used to facilitate the separation of radiation sensitive items like inflatable seals from the individual modules that may have high dose rates and are difficult to service.

According to one or more of these embodiments, the system also includes a fuel assembly bottom nozzle cleaning module that includes: a receptacle configured to engage a lower nozzle of a fuel assembly of the plant; an outlet in fluid communication with an interior of the receptacle, and configured to connect to an inlet of at least one of the plurality of modules so that the pump module causes a water flow that flows sequentially through the fuel assembly in a backwashing direction, into the receptacle, through the outlet of the fuel assembly bottom nozzle cleaning module, and on to the at least one of the plurality of modules; and at least one ultrasonic transducer mounted to the receptacle and shaped and configured to direct ultrasonic energy toward a lower nozzle of a fuel assembly that is engaged with the receptacle.

According to one or more of these embodiments, the pump includes: a casing that forms an impeller chamber having an inlet and an outlet; a driveshaft that is connected to the casing for rotation relative to the casing, a gap being formed between the driveshaft and the casing; and an impeller connected to the driveshaft for rotation with the driveshaft relative to the casing. According to one or more of these embodiments, the impeller includes a first set of at least one vane and a second set of at least one vane. According to one or more of these embodiments, the driveshaft and second set are disposed on an opposite axial side of the impeller as the first set. According to one or more of these embodiments, the first set of at least one impeller vane are shaped and configured to provide a first flow from the inlet of the casing to the outlet of the casing. According to one or more of these embodiments, the second set of at least one impeller vane are shaped and configured to provide a second flow from the gap to the outlet of the casing. According to one or more of these embodiments, the first and second sets are shaped and configured such that during use of the pump, the first flow has a higher flow rate than the second flow. According to one or more of these embodiments, the first and second sets are shaped and configured such that during use of the pump, the first flow has a lower pressure than the second flow.

One or more non-limiting embodiments provides a pump that includes: a casing that forms an impeller chamber having an inlet and an outlet; a driveshaft that is connected to the casing for rotation relative to the casing, a gap being formed between the driveshaft and the casing; and an impeller connected to the driveshaft for rotation with the driveshaft relative to the casing.

According to one or more of these embodiments, the impeller includes a first set of at least one vane and a second set of at least one vane. According to one or more of these embodiments, the driveshaft and second set are disposed on an opposite axial side of the impeller as the first set. According to one or more of these embodiments, the first set of at least one impeller vane are shaped and configured to provide a first flow from the inlet of the casing to the outlet of the casing. According to one or more of these embodiments, the second set of at least one impeller vane are shaped and configured to provide a second flow from the gap to the outlet of the casing.

According to one or more of these embodiments, the first and second sets are shaped and configured such that during use of the pump, the first flow has a higher flow rate than the second flow.

According to one or more of these embodiments, the first and second sets are shaped and configured such that during use of the pump, the first flow has a lower pressure than the second flow.

According to one or more of these embodiments, the impeller includes an integrally formed, non-welded impeller.

According to one or more of these embodiments, the first set and impeller chamber are accessible via the inlet for cleaning purposes.

According to one or more of these embodiments, the second set and casing are shaped and configured such that during use, the second flow tends to flush contaminants out of the interface between (1) the casing and (2) the driveshaft and impeller.

One or more non-limiting embodiments provide a method of using one or more of these embodiments of the modular water purification system. According to one or more of these embodiments, the method includes: interconnecting the pump module with at least one of the at least two purification modules to create at least one flow path therethrough; positioning the interconnected modules underwater in a fuel pool of the nuclear power plant, either before or after said interconnecting; and operating the pump so as to cause at least one flow of water through the interconnected modules, thereby purifying water passing through the interconnected modules.

According to one or more of these embodiments, the at least one of the at least two purification modules includes a particulate filtration module with filter media that is configured to trap particulates, the particulate filtration module having an inlet that is configured to connect to the outlet of the pump module; and the method further includes, after said operating, moving the particulate filtration module to a fuel assembly storage rack in the fuel pool.

According to one or more of these embodiments, the at least one of the at least two purification modules includes a cross-flow filtration module. According to one or more of these embodiments, the operating causes the cross-flow filtration module to separate an incoming flow into (1) a relatively cleaner flow of water that exits the cross-flow filtration module via a first outlet, and (2) a relatively dirtier flow that exits the cross-flow filtration module via a second outlet.

According to one or more of these embodiments, the operating causes the relatively dirtier flow to vent back into the fuel pool.

One or more embodiments provide a system configured to clean a fuel assembly of a nuclear power plant. The system includes: a pump; a filter connected to the pump; and a fuel assembly bottom nozzle cleaning module. The bottom nozzle cleaning module includes: a receptacle configured to engage a lower nozzle of a fuel assembly of the nuclear power plant; a fluid pathway that connects an interior of the receptacle to the pump and filter such that the pump, when on, causes a water flow that flows sequentially through the fuel assembly in a backwashing direction, into the receptacle, and on to the filter; and at least one ultrasonic transducer mounted to the receptacle and shaped and configured to direct ultrasonic energy toward a lower nozzle of a fuel assembly that is engaged with the receptacle so as to dislodge debris from the fuel assembly.

According to various non-limiting embodiments, the filter may include a particulate filter, a cyclonic filter, and/or a strainer filter.

One or more of these and/or other aspects of various embodiments of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment, the structural components illustrated herein are drawn to scale. It is to be expressly understood, however, that the drawings are for the purpose of illustration and description only and are not intended as a definition of the limits of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

All closed-ended (e.g., between A and B) and open-ended (greater than C) ranges of values disclosed herein explicitly include all ranges that fall within or nest within such ranges. For example, a disclosed range of 1-10 is understood as also disclosing, among other ranges, 2-10, 1-9, 3-9, etc.

BRIEF DESCRIPTION OF THE DRAWINGS

For a better understanding of various embodiments as well as other objects and further features thereof, reference is made to the following description which is to be used in conjunction with the accompanying drawings, where:

FIG. 2 is a side view of a pump module according to one or more embodiments of the system shown in FIG. 1.

FIG. 3 is a side view of a cross-flow filter module according to one or more embodiments of the system shown in FIG. 1.

FIG. 4 is a side view of an ion-exchange/demineralization module according to one or more embodiments of the system shown in FIG. 1.

FIG. 5 is a side view of a particulate filter module according to one or more embodiments of the system shown in FIG. 1.

FIGS. 11-14 are side views of various non-limiting exemplary arrangements of various modules according to various embodiments of the system shown in FIG. 1.

DETAILED DESCRIPTION OF EXEMPLARY EMBODIMENTS

Figure 1:
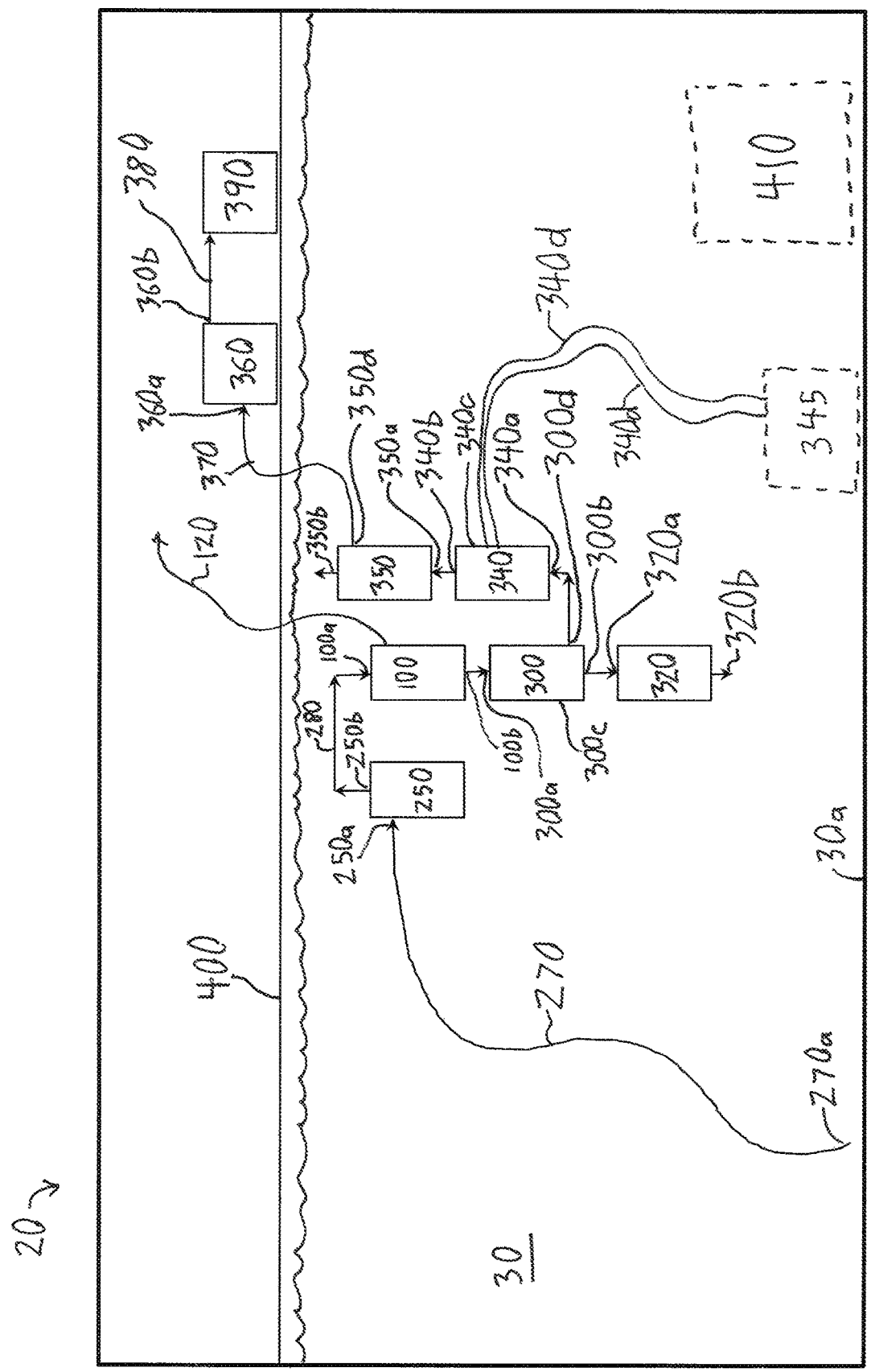
FIG. 1 is a diagrammatic side view of a modular water purification system according to one or more embodiments.

A modular water purification system 10 is configured to remove contaminants from water at a nuclear power plant 20. FIG. 1 illustrates use of the system 10 to purify water in a spent fuel pool 30 of the plant 20. However, the system 10 could alternatively be used to purify fluids in other parts of the plant 20 (e.g., reactor vessels, reactor cavities, primary or secondary coolant loops, etc.) without deviating from the scope of various embodiments.

The power plant 20 includes a reactor and other typical components of a nuclear power plant, depending on the type of plant (e.g., PWR, BWR, CANDU).

Various embodiments of the system 10 include any combination of one, two, or more of the following water processing modules: pump module(s) 100, FOSAR module(s)

250, cross-flow filtration module(s) 300, fine particulate filtration module(s) 320, demineralization/de-ionization module(s) 340, degasification module(s) 350, fuel assembly bottom nozzle cleaning module 450, electrocoagulation module(s), peroxide monitoring/injection module(s), and/or ultraviolet purification module(s). The FOSAR module(s) 250, cross-flow module(s) 300, fine particulate filtration module(s) 320, demineralization module(s) 340, and degasification module(s) 350 are each purification modules that are configured to separate the process fluid (e.g., fuel pool water) into different components (e.g., filtered water, particulates, large objects, etc.). The functions of various of these water processing modules may be combined into single modules (e.g., a single module that includes a pump and FOSAR unit).

Pump Module 100

As shown in FIGS. 1 and 2, the pump module 100 includes a fluid inlet 100a, a fluid outlet 100b, and a housing 100c. As shown in FIG. 2, the module 100 includes a motor 110 that drives a pump 140 via a driveshaft 150.

As shown in FIG. 1, the motor 110 is an electric motor 110 that is powered via an electric power line 120 that leads out of the fuel pool 30 to a power source and suitable motor control equipment (e.g., an on/off and/or speed control switch). According to alternative embodiments, the motor 110 may alternatively be powered by any other suitable energy source (e.g., pneumatic, hydraulic, mechanical, etc.).

Figure 10:
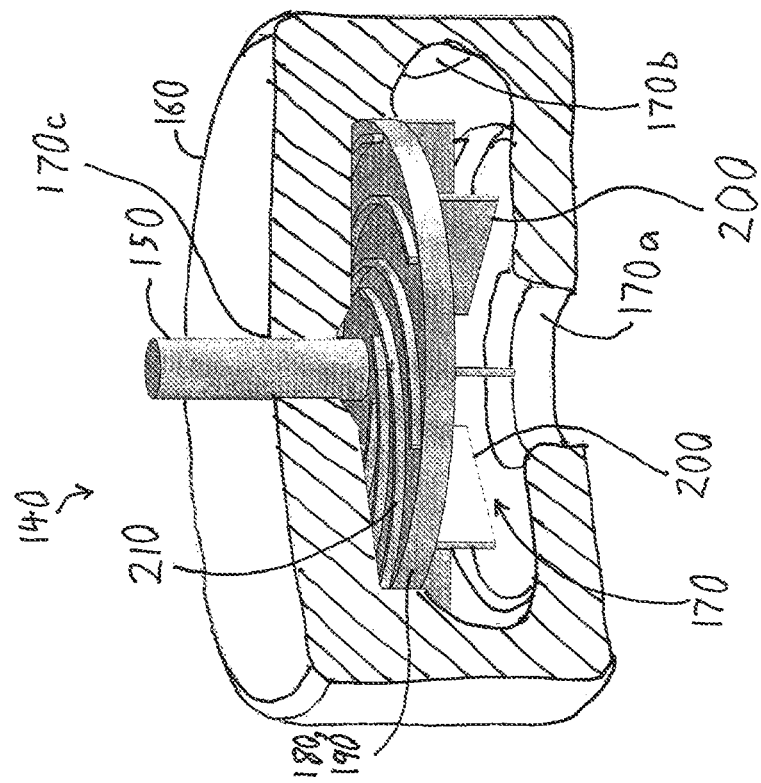
FIG. 10 is a cut-away perspective view of the pump shown in FIG. 9.
Figure 9:
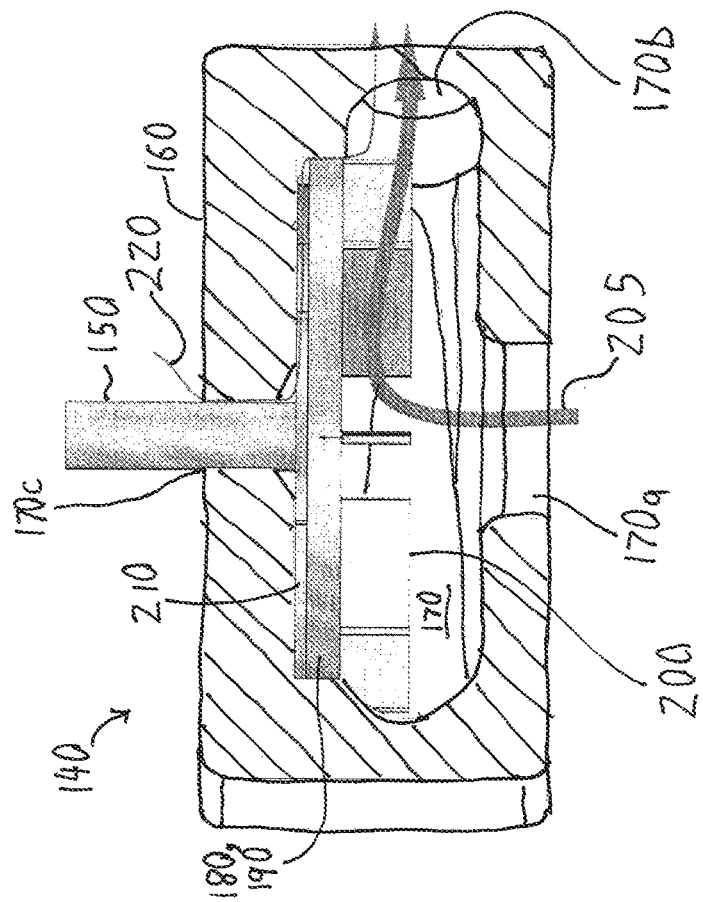
FIG. 9 is a cut-away side view of a pump according to one or more embodiments of the pump module shown in FIG. 2.

As shown in FIGS. 9-10, according to various non-limiting embodiments, the pump 140 is a centrifugal pump that includes a casing 160 that is mounted to or integrally formed with the housing 100c. The casing 160 defines an impeller chamber 170 that has an inlet 170a and an outlet 170b. The inlet 170a is in fluid communication with (or defines) the inlet 100a of the pump module 100, and the outlet 170b is in fluid communication with (or defines) the outlet 100b of the pump module 100. An impeller 180 of the pump 140 is attached to the driveshaft 150 so as to be rotatable within the chamber 170 when the driveshaft 150 is driven by the motor 110.

As shown in FIGS. 9 and 10, the impeller 180 includes a disc-shaped body 190 that axially separates a set of high-flow, low-pressure impeller vanes 200 from a set of low-flow, high-pressure impeller vanes 210. The high-flow vanes 200 may extend in a purely or mostly radial direction, and are configured to provide a high-flow-rate, low-pressure flow 205 of water from the inlet 170a to the outlet 170b. This flow 205 drives a bulk of the fluid through the interconnected modules of the system 10. The vanes 200 provide an open impeller design that facilitates the non-damaging and/or free passage of substantially sized solids through the pump 140 via the flow 205.

According to various embodiments, the inlet 170a is directly accessible when the module 100 is separated from an upstream module (or if an upstream module is not used so that the inlet 170a forms the direct inlet from the fuel pool 30). Such accessibility facilitates direct access to the vanes 200 and a substantial portion of the impeller chamber 170 to aid in rinsing/decontamination of the pump 140 after use.

The high-pressure vanes 210 may be spiral-shaped, and are configured to provide a relatively higher-pressure, lower-flow-rate flow of water from (1) a small inlet 170c formed by a gap between the casing 160 and driveshaft 150 to (2) the outlet 170b, along the flow path arrow 220 in FIG. 9. This high-pressure flow 220 is configured to discourage debris from lodging between the casing 160 and impeller 180 at the narrow interface between the two. The high pressure flow 200 may also discourage debris buildup along other surface and/or crevices of the pump 140. As a result, the vanes 210 and flow 220 tend to push contaminants into the bulk fluid flow 220 so as to avoid contaminant buildup in the pump 140, and tend to limit the activity of the pump 140 components.

The flow 220 may form a hydraulic bearing between the casing 160 and driveshaft 150/impeller 180 that tends to reduce friction therebetween.

According to various embodiments, a shaft seal between the casing 160 and driveshaft 150 (or impeller 180) is omitted, as the high-pressure flow 220 discourages fluid flow from the chamber 170 out of the pump through the inlet 170c between the driveshaft 150 and casing 160. Such flow 220 may therefore facilitate a seal-less configuration that avoids the use of elastomeric and/or other non-radiation-tolerant seals that could degrade under radiation exposure.

According to various embodiments, inward leakage along the flow 220 is acceptable, and there is no need for sealing when the pump 140 is off due to the submerged environment in which the module 100 is stored and the lack of internal line pressure within the chamber 170 when the pump 140 is off.

According to various embodiments:
i) the vanes 210 are configured to provide higher pressure flow than the vanes 200;
ii) the vanes 210 are configured to provide lower flow rate flow than the vanes 200;
iii) the vanes 210 are axially (i.e., along an axis of the driveshaft 150) shorter than the vanes 200; and/or
iv) the respective vanes 210 progress more circumferentially (e.g., a spiral direction) than the vanes 200 as they extend radially outwardly on the disc 190.

According to various embodiments, the impeller 180 and/or casing 160 each have a single-piece construction (as opposed to a stamped and welded fabrication) that reduces or minimizes the number and size of crevices that could trap contaminated particles.

According to various embodiments, the impeller 180 and housing 160 are oriented such that gaps/clearances tend to face downwardly (in terms of gravity) so as to minimize the gravity-based settling of particles in such gaps/clearances between periods of use of the pump module 100.

For typical purification applications, the pump module 100 may be sized to produce gross flow rates (including the contributions of both sets of vanes 200, 210) of (1) at least 10, 20, 30, 40, 50, 60, 70, 80, 90, 100, 110, 120, 130, 140, 150, 160, 170, 180, 190, 200, 250, 300, 400, and/or 500 gallons/minute, (2) less than 2000, 1500, 1250, 1000, 750, 600, 500, 450, 400, 350, 340, 330, 320, 310, 300, 290, 280, 270, 260, 250, 240, 230, 220, 210, and/or 200 gallons/minute, and/or (3) between any two such upper and lower rates (e.g., between 10 and 2000 gallons/minute, between 50 and 1000 gallons/minute, between 100 and 500 gallons/minute, and/or between 150 and 300 gallons/minute). However, for general purification of larger volumes of water (for which higher turnover is beneficial to facilitate more rapid cleanup), the size of the pump 140 and module 100 may be increased and/or multiple pumps 140, modules 100, and/or water processing modules may be utilized in parallel to achieve higher flow rates (e.g., 3,000 gallons/minute).

The pump module 100 delivers flow to and/or from other modules attached thereto. According to various embodiments, various water processing modules (e.g., the FOSAR module 250 and/or particulate module 320) may be disposed upstream from the pump module 100 so as to reduce the amount of contaminants flowing through the pump module 100, which may avoid damaging the pump module 100 and/or reduce its activity.

FOSAR Module 250

Figures 7, 8:
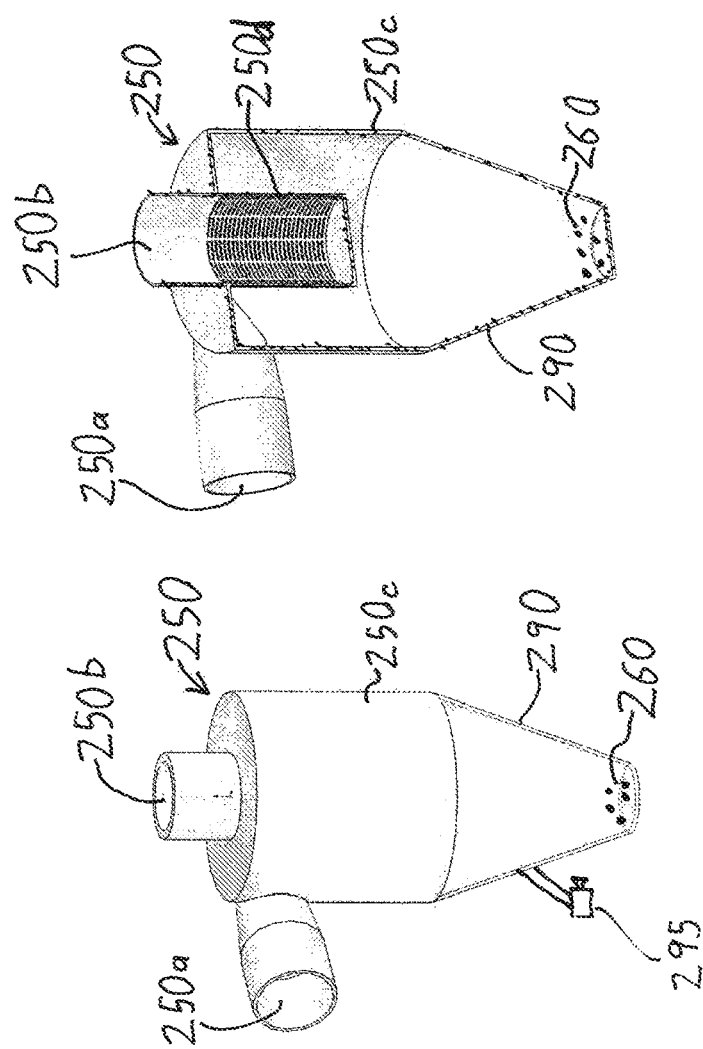
FIG. 7 is a side perspective view of a FOSAR module according to one or more embodiments of the system shown in FIG. 1.
FIG. 8 is a cut-away view of the FOSAR module of FIG. 7.

As shown in FIG. 1, the FOSAR module 250 supports collection of Foreign Object Search And Retrieval (FOSAR). As shown in FIG. 1, the FOSAR module 250 includes an inlet 250a that connects to a vacuum hose 270, and an outlet 250b and connects (either directly or via an intermediate conduit 280) to the inlet 100a of the pump module 100. According to alternative embodiments, the FOSAR module 250 may alternatively be incorporated physically into the pump module 100. As shown in FIGS. 7-8, a housing 250c of the FOSAR module 250 incorporates a cyclone separator and/or a perforated screen 250d to separate out large objects 260 (e.g., >0.5, 0.6, 0.7, 0.8, 0.9, 1.0, 1.1, 1.2, 1.5, 2.0, and/or 2.5 mm diameter) while allowing smaller contaminants to pass through. However, according to alternative embodiments, other types of object separators (e.g., other than a centrifugal separator) may be used to separate large objects 260 from the water flowing through the module 250.

According to various non-limiting embodiments, positioning of the FOSAR module 250 early in the flow stream of the system 10 physically protects downstream modules (e.g., the pump module 100) from damage that might otherwise be caused by such large objects 260.

According to various non-limiting embodiments, highly activated large objects 260 (e.g. pieces of activated stellite) may represent the largest risk of equipment "hot spots" wherein elevated radiation dose rates would make it difficult or impossible to transport or maintain the pump module 100. As shown in FIGS. 7-8 according to various non-limiting embodiments, the FOSAR module 250 may capture these objects 260 early in the flow stream to provide radiological and/or physical protection for the pump module 100 and other downstream modules.

It is sometimes desirable to identify the nature and origin of debris 260 prior to disposal. For example, as shown in FIG. 1, according to various embodiments, the vacuum hose 270 of the system 10 may be used to vacuum the underwater floor 30a of the pool 30 after a Foreign Material Intrusion event (e.g. ball bearing failure). According to various embodiments, the FOSAR module 250 may be used to collect and account for each of the individual pieces 260 to enable definitive confirmation of whether or not all of the foreign material has been recovered. According to various embodiments and as shown in FIG. 7, the FOSAR module 250 includes a camera 295 mounted to the housing 250c or other suitable portion of the module 250 of system 10 (e.g., a separate remotely operated submersible robot). All or a portion of the lower collection receptacle 290 of the module 250 may comprise a camera-transparent material (i.e., transparent to the light wavelength being sensed by the camera 295) that enables the camera 295 to see into the receptacle 290, so as to enable a remote user to examine photos and/or video from the camera 295 and identify the objects 260 therein. Additionally and/or alternatively, the camera 295 may be mounted inside the housing 250c so as to directly see the objects 260 in the receptacle 290. According to various embodiments, the vacuum hose 270 is manipulated by a robotic material handling tool of the plant 20 so as to vacuum debris in chosen areas within the pool 30.

According to various embodiments, the bottom, cone-shaped collection receptacle portion 290 of the module 250 may comprise a detachable bucket 290 (or other receptacle) that may be detached from the remainder of the module 250 to facilitate supplemental inspection and/or removal of the large objects 260 trapped in the receptacle of the FOSAR module 250. Additionally and/or alternatively, the bottom of the module 250 may include a selectively releasable trap door that can be manually opened when a separate collection container is disposed below the module 250, so that the large objects 260 fall into the discrete collection container.

Additionally and/or alternatively, the FOSAR module 250 may be configured to be manually manipulated so as to selectively release the large objects 260 back into the fluid flow so as to be re-collected in a downstream filter module 320 for long term storage/disposal. For example, the module 250 may incorporate a valved by-pass conduit that connects the bottom of the module 250 (instead of the outlet 250b) to the next downstream module (e.g., the pump module 100). The valve may be opened to cause the objects 260 to flow to the next downstream module.

Additionally and/or alternatively, large objects 260 collected in the bucket 290 or other container could be released directly into the radiation tolerant filtration/storage module(s) described below, such that their filter elements could be used to collect and store large debris 260 that would otherwise be too large to pass through the pump module 100 and/or other modules. For example, this could be done by (1) repositioning the FOSAR module 250 downstream from the pump module 100 and upstream from particulate filtration module 320, and/or (2) disconnecting the filter module 320 so that objects 260 can be dumped from the receptacle directly into the inlet 320a of the filtration module 320.

According to various embodiments, the FOSAR module 250 is eliminated, and the vacuum hose 270 connects directly to the inlet 100a of the pump module 100.

Cross-Flow Module 300

As shown in FIGS. 1 and 3, the cross-flow module 300 includes a housing 300c, an inlet 300a, a dirty/contaminant-concentrated outlet 300b, and a filtered/clean water outlet 300d. As shown in FIG. 1, the cross-flow module 300 can be used to separate the flow from the pump module 100 into relatively clean water (which exits through the outlet 300d) and relatively contaminated/dirty/concentrated water (which exists through the outlet 300b) without fouling filtration media to accomplish such separation/purification. The cross-flow module 250 relies on well-known cross-flow separation principles. According to various embodiments, the volumetric flow rate out of the dirty/debris-concentrated outlet 300b is smaller than the volumetric flow rate out of the filtered water outlet 300d.

According to various embodiments, the cross-flow module 300 facilitates the use of other downstream water processing modules (e.g., demineralization module 340, degasification module 350) without needing a dedicated particulate filtration module 320 to prevent these other modules 340, 350 from becoming contaminated or damaged by high activity contamination. For example, in the module arrangement shown in FIG. 13, a fine particle filtration module 320 is omitted, and the dirty/concentrated flow through the outlet 300b vents directly back into the fuel pool 30, which avoids having the contaminants foul filtration media of the system 10.

Additionally and/or alternatively, when used in conjunction with a downstream particle filter module 320 (e.g., as shown in FIGS. 1 and 11), the cross-flow filter module 250 may serve to concentrate the contaminants into a lower flow rate stream that exits through the outlet 300b and into the downstream particulate filter module 320, thus reducing the flow rate through the downstream particle filter module 320.

This effect can be leveraged to achieve a higher overall system flow rate for a given filter module 320 flow rate capacity.

Fine Particulate Filtration Module 320

As shown in FIGS. 1 and 5, the fine particulate filtration module 320 includes a housing 320*c*, an inlet 320*a*, and an outlet 320*b*. According to various embodiments, the fine particulate filtration module 320 includes fine-mesh filter material that is designed to capture contaminants, corrosion product particulate, and/or silica (e.g., from degradation of boroflex spent fuel racks). This module 320 may incorporate, for example, the filtration technology disclosed in U.S. Pat. No. 8,052,879, which is incorporated herein by reference in its entirety.

The filter(s) (e.g., serial and/or parallel filters or filter cartridges) of the module 320 may utilize all metal construction and all-metal filtration media. According to various non-limiting embodiments, the filter(s) of the module 320 are designed to trap particulates with diameters equal to or greater than (0.01, 0.02, 0.03, 0.04, 0.05, 0.06, 0.07, 0.08, 0.09, 0.1, 0.2, 0.3, 0.4, 0.5, 0.6, 0.7, 0.8, 0.9, and/or 1.0 microns). According to various embodiments, a 0.5 micron threshold is appropriate for most pool 30 cleanup applications. Finer filtration grade variants (e.g., down to 0.1 micron or below) could be implemented for specific applications as appropriate.

According to various embodiments, filters within the module 320 can also be backwashed with or without ultrasonic agitation to regenerate filtration capacity, for example, in the manner described in U.S. Pat. No. 8,052,879.

Testing and field experience has shown that various non-limiting embodiments of these particulate filtration modules 320 can hold significantly more high activity corrosion products than various prior art filters and filter containers. According to various non-limiting embodiments, the capacity of these filter modules 320 is not overly limited by activity collected because the particulate filtration modules 320 are constructed of radiation tolerant materials (e.g., constructed of metal and/or ceramics; constructed of materials other than organic material or plastics) and can remain underwater (and thus heavily shielded) for extended periods.

Various conventional filters are constructed of materials such as plastic, paper, and/or other organic materials that are not radiation tolerant. As a result, these materials deteriorate if high activity particulate is collected. Also, they are not suitable for long term storage in spent fuel pool environments to allow radionuclides to decay. For example, a high capacity filter container offered by DTS (now owned by Avantech) incorporates these plastic/paper filters into heavily shielded containers that are pre-packaged for waste disposal. Because these containers comprise numerous plastic/paper filters, these containers have correspondingly higher capacity (on a mass basis). However, these pre-packaged filter containers are installed above the water and the quantity of material collected is typically limited by activity to avoid exposing workers to high levels of radiation. Thus, the higher capacity of these filters is not fully utilized. Also, topside (i.e., above water) filtration is, in general, undesirable as any highly activated object/particle could expose workers to high levels of radiation during transit in hoses, and could pose more serious problems if the object/particle becomes trapped in the portion of hose that is located above the water.

In the embodiment illustrated in FIG. 1, the inlet 320*a* of the filter module 320 connects to the dirty/debris-concentrated outlet 300*b* of the cross-flow filter module 300. The module 320 therefore receives a concentrated, relatively low flow rate flow of contaminant-filled water. Alternatively, as shown in FIG. 12, the inlet 320*a* of the filter module 320 may connect directly to the outlet 100*b* of the pump module 100 (i.e., without an intermediate cross-flow filter module 300).

According to various embodiments, multiple filter modules 320 may be arranged in parallel to increase the overall flow rate through the system 10.

Demineralization Module 340

The demineralization module 340 includes a fluid inlet 340*a*, a filtered fluid outlet 340*b*, and a housing 340*c*. The demineralization module 340 removes ionic corrosion products. This module 340 may use the same outer packaging and interfaces as the particulate filtration module 320, but is filled with ion exchange resin instead of filtration media. As shown in FIG. 4, this module 340 may also include underwater fluid connections 340*d* that connect to a solid waste processing system 345 of the plant 20 such that spent resin from the module 340 can be sluiced directly to this system 345 when its capacity is exhausted or when water purification is complete. Such connections can leverage the existing capability of the plant's solid waste processing system 345 to handle waste collected by the system 10.

As shown in FIG. 1, the solid waste processing system 345 may comprise an intermediate storage vessel 345 disposed in the fuel pool 30 (e.g., lying on the underwater floor 30*a* of the pool 30).

In the embodiments illustrated in FIGS. 1, 11, and 13, the clean water outlet 300*d* of the cross-flow module 300 connects to the inlet 340*a* of the demineralization module 340 so as to provide pre-filtered water to the demineralization module 340. In the module arrangement shown in FIG. 13, a fine particle filtration module 320 is omitted, and the dirty/concentrated flow through the outlet 300*b* vents directly back into the fuel pool 30. In the embodiment illustrated in FIG. 14, the outlet of the pump module 100 may connect directly to the inlet 340*a* of the demineralization module 340.

Degasification Module 350

Figure 6:
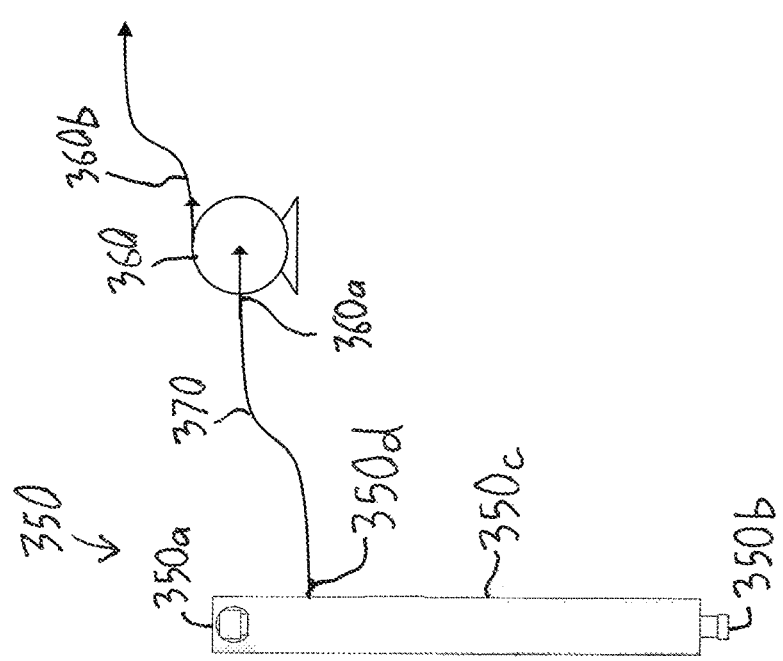
FIG. 6 is a side view of a degasification module according to one or more embodiments of the system shown in FIG. 1.

As shown in FIGS. 1 and 6, the degasification module 350 includes a water inlet 350*a*, a water outlet 350*b*, a housing 350*c*, and an extracted gas outlet 350*d*. According to various embodiments, the water inlet 350*a* connects to a clean water outlet 300*b* of the cross-flow module 300 either (1) directly, as illustrated in FIGS. 11 and 13, or (2) indirectly via the intervening demineralization module 340, as shown in FIG. 1. Alternatively, as shown in FIG. 14, the outlet of the pump module 100 may connect directly to the inlet 350*a* of the degasification module 350.

As shown in FIGS. 1 and 6, the extracted gas outlet 350*d* fluidly connects to an inlet 360*a* of a vacuum pump 360 via a connecting vacuum hose 370. As shown in FIG. 1, an outlet 360*b* of the pump 360 connects via a hose 380 to a gas waste processing system 390 of the plant 20 such that gas may be safely and efficiently evacuated once removed. Alternatively, the outlet 360*b* may simply vent to the atmosphere within the plant 20 (e.g., the air above the fuel pool 30).

As shown in FIG. 1, the hose 370 passes from underwater to above water such that the pump 360 is above water (e.g., sitting on an above-water floor 400 adjacent to the fuel pool 30). Alternatively, if appropriate upstream modules/peripherals are used to remove high activity particulate/debris, the degasification module 350 may be installed above water (e.g., on the floor 400 adjacent the pump 360). In such an embodiment, a suitable hose may connect the underwater upstream module to the above-water degasification module 350.

This module 350 may utilize the same outer packaging and interfaces as the particulate filtration module 320 and operate underwater.

The degasification module 350 removes radioactive and non-radioactive gases. According to one or more embodiments, gas is removed via one or more membrane filters within he module 350 and vacuum pressure within the module 350 created by the pump 360. According to various embodiments, the membrane filters each contain a plurality of hollow fibers that are permeable to the gases to be removed. However, additional and/or alternative gas removal equipment may be incorporated into the module 350 without departing from the scope of the invention.

Fuel Assembly Bottom Nozzle Cleaning Module 450

Figure 15:
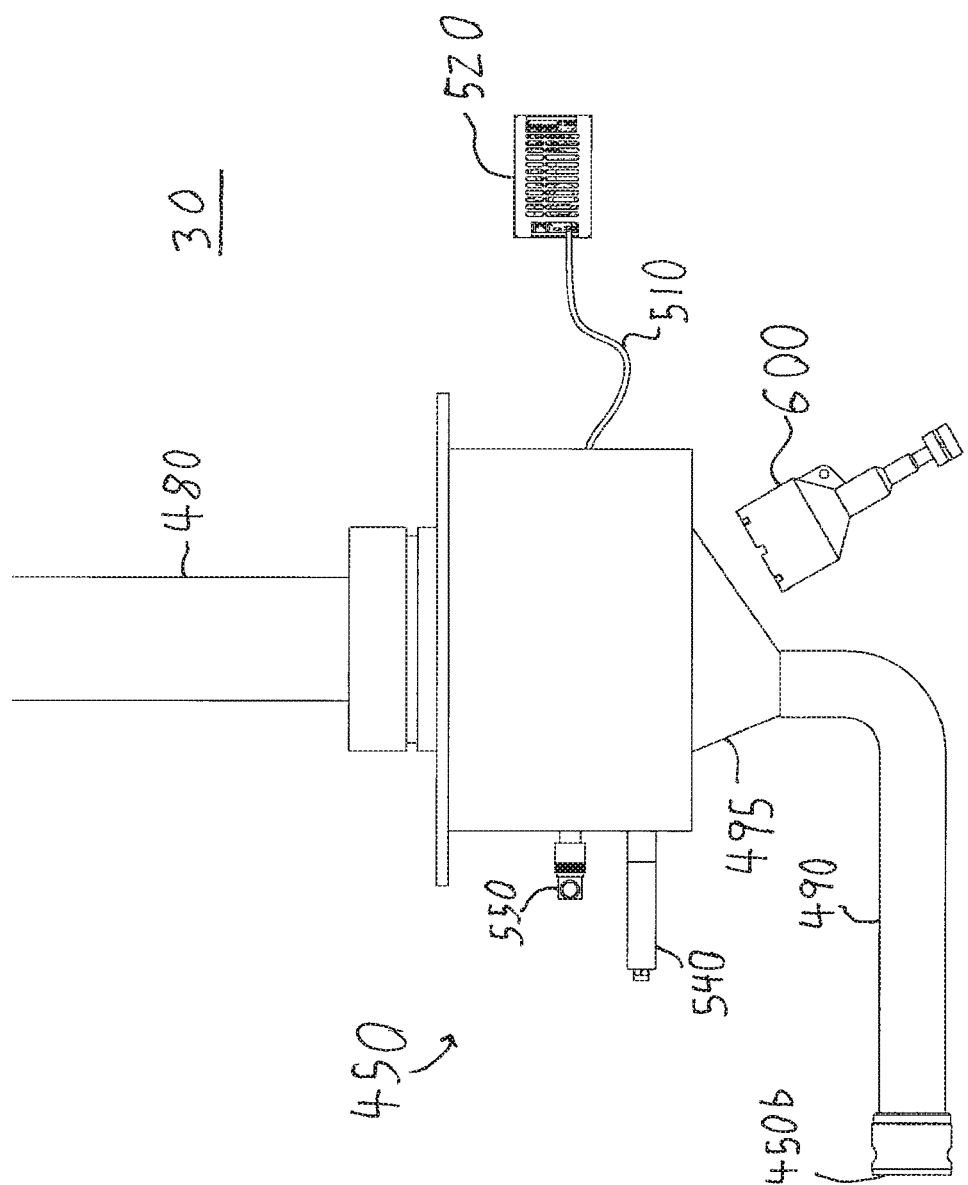
FIG. 15 is a side view of a fuel assembly bottom nozzle cleaning module according to various embodiments of the system shown in FIG. 1.
Figure 16:
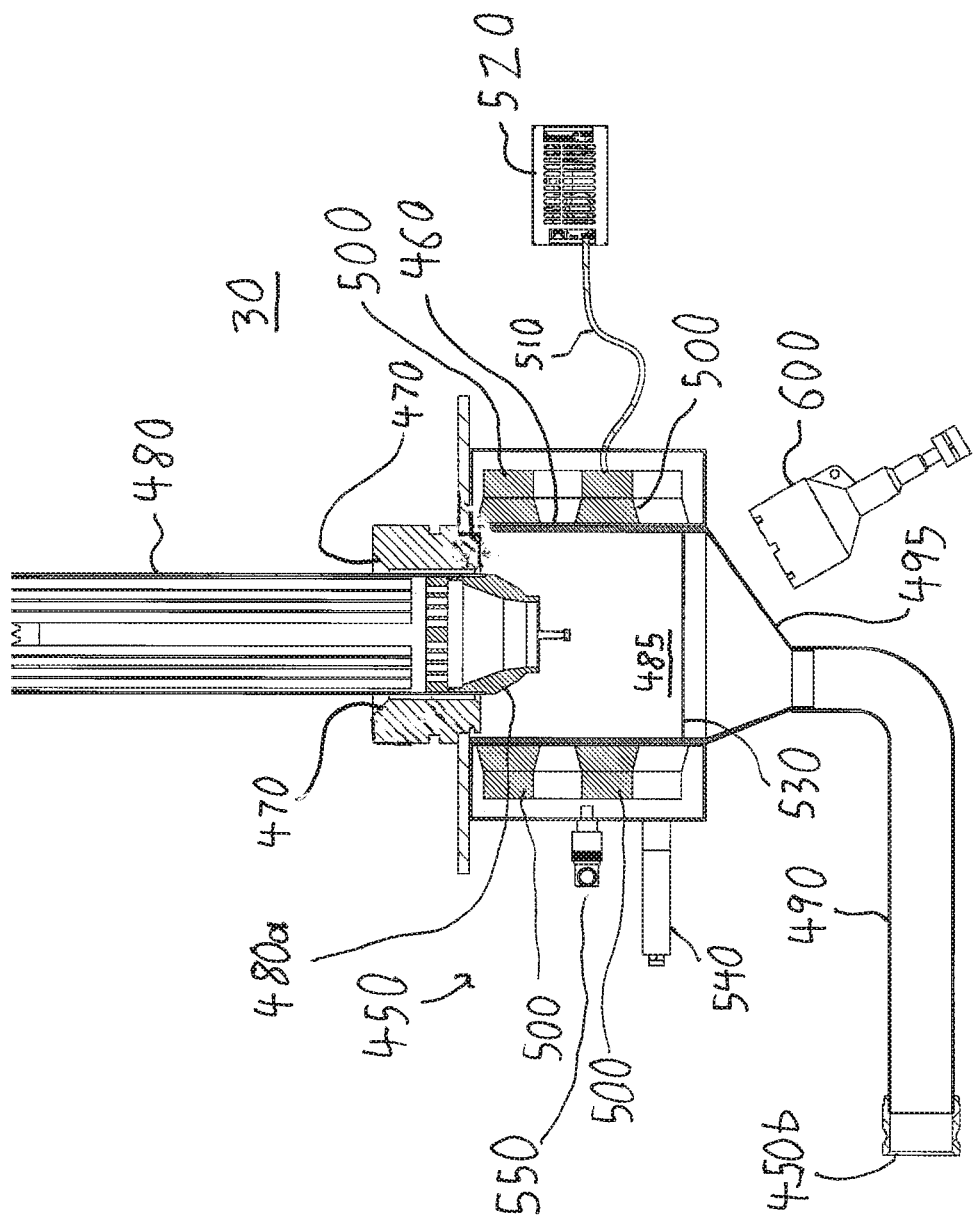
FIG. 16 is a side, partially-cutaway view of the bottom nozzle cleaning module shown in FIG. 15.

PWR and BWR fuel assemblies (e.g., the fuel assembly 480 illustrated in FIGS. 15-16) often include devices, features or other provisions to trap, capture, retain and/or collect foreign objects, debris and other material upstream of the remainder of the assembly 480. These devices are often integrated into a lower nozzle 480a of the fuel assembly 480. If such materials (e.g., foreign objects) are allowed to pass through (i.e., upwardly as shown in FIGS. 15-16) or become trapped within the fuel assembly 480, fuel damage by fretting, impact, or wear can occur. These materials may also interfere with the function of fuel assembly structures such as grids, mixing vanes, and other supports. These objects may become highly irradiated and therefore pose a dose problem if they are released from the fuel assembly 480 and transported to other parts of the plant 20's reactor coolant system (RCS). Their release can also lead to damage of other plant 20 components such as valves, pumps, control rods, and instrumentation. Furthermore, such debris may represent a source of activated metals and corrosion products, particularly if they are debris from plant components that are constructed from cobalt bearing materials such as valve seats, owing to the high susceptibility of their activation to other cobalt species (Co-60).

In some cases, these undesirable objects/debris are fully retained by the bottom nozzle 480a's integrated collection devices by capture (analogous to filtration). In other cases, these materials fall away from the collection device by gravity when upward flow through the fuel assembly 480 stops during plant shutdown. Other debris may be held in place by "cementing" action of primary system CRUD (Chalk River Unidentified Deposit), which may also accumulate on the capture device, or by corrosion product deposits that form during contact between the debris and the capture device.

The lower nozzle 480a debris protection devices may not permanently capture/retain objects, and these objects/debris can continue to irradiate, dissolve/corrode (release activated and non-activated metals and corrosion products), or fall away into the RCS or fuel pool 30 during movement (e.g., refueling activities), shuffles, or racking of the assemblies 480. It is therefore desirable to remove objects/debris that are attached to the fuel assembly 480 (e.g., "cemented" in place or physically lodged in the device) before $1^{st}$ or $2^{nd}$ burn fuel assemblies 480 are reused, or $3^{rd}$ burn fuel assemblies 480 are stored in the pool 30 or in dry casks.

As explained below, the fuel assembly bottom nozzle cleaning module 450 is designed to clean such deposits/CRUD/debris/contaminants out of the lower nozzle 480a and associated collection devices and vacuum the debris/objects/etc. into the filtration components of the system 10.

Figure 17:
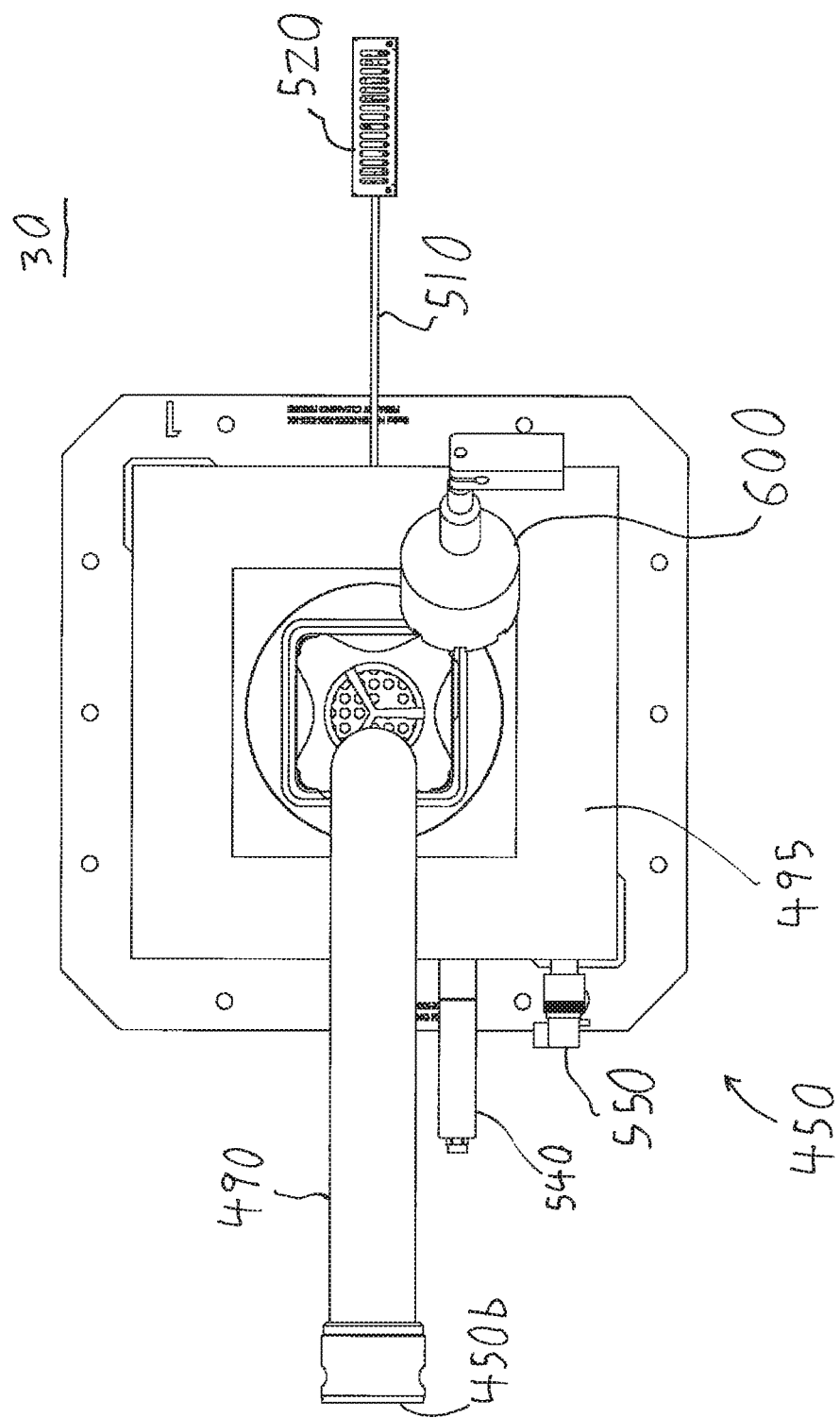
FIG. 17 is a bottom view of the bottom nozzle cleaning module shown in FIG. 15.

As shown in FIGS. 15-17, and more specifically in FIG. 16, the fuel assembly bottom nozzle cleaning module 450 includes a receptacle 460 (or other chamber) with an opening 470 that is shaped and configured to accommodate a lower-nozzle 480a of a fuel assembly 480 of the plant 10. The engagement between the opening 470 and lower nozzle 480a may be substantially water-tight, or may be loose. According to various non-limiting embodiments, the assembly 480 may be held in engagement with the receptacle 460 by gravity, the plant 20's fuel handling equipment, a further brace, support, or latch of the module 450, and/or vacuum suction. According to various embodiments, once the assembly 480 and module 450 are engaged, the module 450 may support the assembly 480 (e.g., if the module 450 is resting on the underwater floor 30a of the pool 30) or vice versa (e.g., if the module 450 is attached to the fuel assembly 480 while the assembly 480 is being suspended underwater in the fuel pool 30 by the plant 20's fuel assembly handling equipment).

According to various embodiments, as shown in FIG. 16, the receptacle 460 comprises a metal box with an open top. The module 450 includes a water outlet 450b that fluidly connects to an interior volume 485 of the receptacle 460, for example via a hose 490 or other conduit. The outlet 450b is configured to attach to the inlet 270a of the vacuum hose 270 (or the inlet of other system 10 modules (e.g., the pump module 100)), for example via suitable connectors, as described below.

As shown in FIG. 16, one or more ultrasonic transducers 500 are mounted to the receptacle 460 and oriented so as to direct ultrasonic energy into the interior volume 485 and toward the lower nozzle 480a. The ultrasonic transducers are connected, via suitable electric cord(s) 510 to a power supply 520 that may be disposed on the floor 400 above water.

Hereinafter, use of the fuel assembly bottom nozzle cleaning module 450 is described in connection with FIGS. 15-17. As shown in FIG. 16, the module 450 is placed in a suitable location, for example, such that the receptacle 460 is lying on the underwater floor 30a of the fuel pool 30 or supported by the fuel assembly 480 so that it is underwater. According to various embodiments, the receptacle 460 may be mounted securely to an underwater location within the pool 30 (e.g., via an appropriate support structure). The outlet 450b is connected to the inlet of the hose 270 (or to any other inlet of any other module of the system 10). The fuel assembly 480 is then engaged with the opening 470 on top of the module 450 so that the lower nozzle 480a is inserted into or otherwise engaged with the opening 470. The pump module 100 is turned on to provide water flow through the fuel assembly 480, into the receptacle 460, out of the outlet 450b and on to appropriate filtration module(s) of the system 10 (e.g., FOSAR module 250, pump module 100, particulate filtration module 320) to facilitate the collection and/or inspection of collected debris from the fuel assembly 480. This flow through the fuel assembly 480 is in a backwashing/counterflow direction (i.e., downwardly as shown in FIG. 16), which is the opposite direction as flow through online fuel assemblies 480 during normal plant 20 operation. The power supply 520 is turned on to energize the ultrasonic transducers 500, which directs ultrasonic energy into the receptacle 485, lower nozzle 480a, and/or fuel assembly 480. The backwashing flow and/or ultrasonic energy dislodges materials/debris/objects lodged in the debris device, crud (which may be "cementing" larger objects to the debris device), and/or other contaminants/ debris in or around the lower nozzle 480a or other components of the fuel assembly 480.

According to various embodiments, as shown in FIG. 16, debris/objects may also be collected by gravity settling, in a first coarse strainer 530 disposed in the flow path between the lower nozzle 480a and outlet 450b. The debris/objects collected by the strainer 530 may be directly examined (e.g., via a camera 600) after the fuel assembly 480 is detached from the receptacle 460 or through a funnel 495 directing flow from the receptacle 460 to the hose or other conduit 490 and fabricated of a camera-transparent (i.e., transparent to the light wavelength being sensed by the camera) material as shown in FIG. 16. Additionally and/or alternatively, the FOSAR module 250 may be used to collect and examine the debris.

Additional openings may be formed in the receptacle 460 to allow for passive decay heat removal flow, and may be designed such that flow through the module 450 is controlled as a fuel assembly 480 flow and a bypass flow (e.g. slotted openings in side of receptacle 460 that are gradually blocked as the fuel assembly 480 is more fully engaged with the receptacle 460. The module 450 may include radiation detectors 540 to detect radiation within the receptacle 460 or in the conduit 490. The module 450 may include pressure detectors (e.g., pressure transducer(s), differential pressure detector (or a combination of multiple pressure detectors)) 550 to assess the degree of cleaning of the nozzle 480a.

According to various embodiments, use of the module 450 may remove objects/debris that would otherwise continue to become irradiated during later use of the assembly 480 in the reactor, where such objects could be susceptible to later dissolution and/or separation from the assembly 480, which could contribute to RCS dose.

Additional Modules and Components

The modular purification system 10 may also incorporate one or more of the following additional and/or alternative components, modules, and peripherals to facilitate improved system operation or to achieve specific purification objectives.

According to various embodiments, the system 10 may include one or more custom suction/discharge adapters that fluidly connect an upstream inlet 270a of the vacuum hose 270 to the following optional components to facilitate a variety of local purification objectives, including:

i) an ultrasonic vacuum wand for local disruption/cleaning and removal of particulate from a specific location. Example applications include: enhanced vacuuming of BWR guide tubes or decontamination of reactor vessel welds to facilitate inspections.

ii) Floor 30a vacuuming attachment to facilitate more effective cleaning of horizontal surfaces. Example applications include cask pit, cavity, and suppression pool vacuuming.

iii) Hydraulically-actuated floor 30a vacuuming robot to facilitate automated cleaning of horizontal surfaces. Example applications include the fuel pool, cask pit, cavity, torus, and suppression pit vacuuming.

According to various embodiments, the system 10 includes an electrocoagulation module, which may have the same outward appearance and connectors/inlets/outlets as any of the other above-discussed modules (e.g., the module 320). The electrocoagulation module is preferably disposed in the system 10 upstream from the particulate filtration module 320 to promote agglomeration of colloids so that they may be more effectively removed in the downstream particulate filtration module 320. Other techniques may also be used to promote colloid aggregation. According to various embodiments, the combination of agglomeration/coagulation technology with that of the high capacity backwashable particulate filtration module 320 may be synergistic, in that it allows for collection and retention of colloidal particulate that is well below the micron rating of various embodiments of the particulate filtration module 320. For example, the backwashing technology disclosed in U.S. Pat. No. 8,052,879 involves the periodic transfer of collected particles from the active filter media to a high capacity storage area with a thick filter cake. Once established, cake filtration in the high capacity region provides improved collection and retention of colloidal particles. According to various embodiments, that thick filter cake pre-coats the filter media in the module 320 and improves the collection and retention of colloidal particles by the module 320.

According to various embodiments, the system 10 includes a peroxide monitoring/injection module, which may have the same outward appearance and connectors/inlets/outlets as any of the other above-discussed modules (e.g., the module 320). The peroxide monitoring/injection module may maintain appropriate levels of peroxide residual in the spent fuel pool 30 or reactor cavity in order to prevent unexpected/extended releases of corrosion products from fuel assemblies during defueling/refueling activities, improve water clarity due to silica contamination, and prevent biological growth (especially at decommissioning plants where water pools may be stagnant for extended periods during dismantling activities).

According to various embodiments, the system 10 includes one or more radiation detectors to detect radiation in various locations within the system 10 (e.g., within the receptacle 460 of the module 450, within the particulate filtration module 320, within the receptacle 290 of the FOSAR module 250, in a conduit connecting any of the modules or other components of the system 10, etc.). Such radiation detectors may be used to monitor transient and/or collective doses at certain locations. A high transient dose may indicate the possible removal of an irradiated object.

According to various embodiments, the system 10 includes one or more pressure sensors to sense a pressure in various locations within the system 10 (e.g., upstream and downstream of the pump module 100; in any one or more of the conduits connecting any of the modules; in the particulate filtration module 320 to detect when the filter media is becoming saturated; etc.).

According to various embodiments, the system 10 includes an ultraviolet purification module, which may have the same outward appearance and connectors/inlets/outlets as any of the other above-discussed modules (e.g., the module 320). The ultraviolet purification module includes a UV light (e.g., powered by a power cord similar to the cord 120 used by the pump module 100) that may be used to assist with control of biological species. According to various embodiments, a UV light may alternatively be incorporated into the pump module 100 so that water flowing through the pump module 100 is exposed to the UV light and the UV light is powered by the cord 120.

Although the system 10 has been described as including various combinations of components/modules, any of these modules/components may be omitted without deviating from the scope of the invention.

The system 10 is described as including various conduits (e.g., hoses, passageways, pipes, etc.). It should be understood that all such conduits may comprise any suitable form (e.g., rigid or flexible hoses, pipes, or other passageways) without deviating from the scope of various embodiments.

Interconnection Between Modules and Exemplary Arrangements

According to various embodiments, the system 10 is designed to interconnect one or more of the above-discussed modules/units/components using standardized interfaces. For example, according to various embodiments, the inlets (e.g., inlets 100a, 250a, 270a, 300a, 320a, 340a, 350a) may be standardized, and configured to attach to any of the outlets (e.g., outlets 100b, 250b, 300b, 300d, 320b, 340b, 350b) via connectors that can be rapidly connected/disconnected (remotely if needed). Consequently, the various modules may be used in a number of different configurations depending on the nature of contaminants to be removed (e.g., ionic, colloidal and particulate corrosion products, radioactive and non-radioactive gases, machining debris, and/or biological species). These configurations may include a long arrangement serial, parallel, and/or mixed serial/parallel modules. Multiple modules of the same type may be arranged in parallel to facilitate higher process fluid flow rates and/or higher debris/contaminant storage capacity. Multiple modules may be arranged in series to provide improved filtration.

Figure 18:
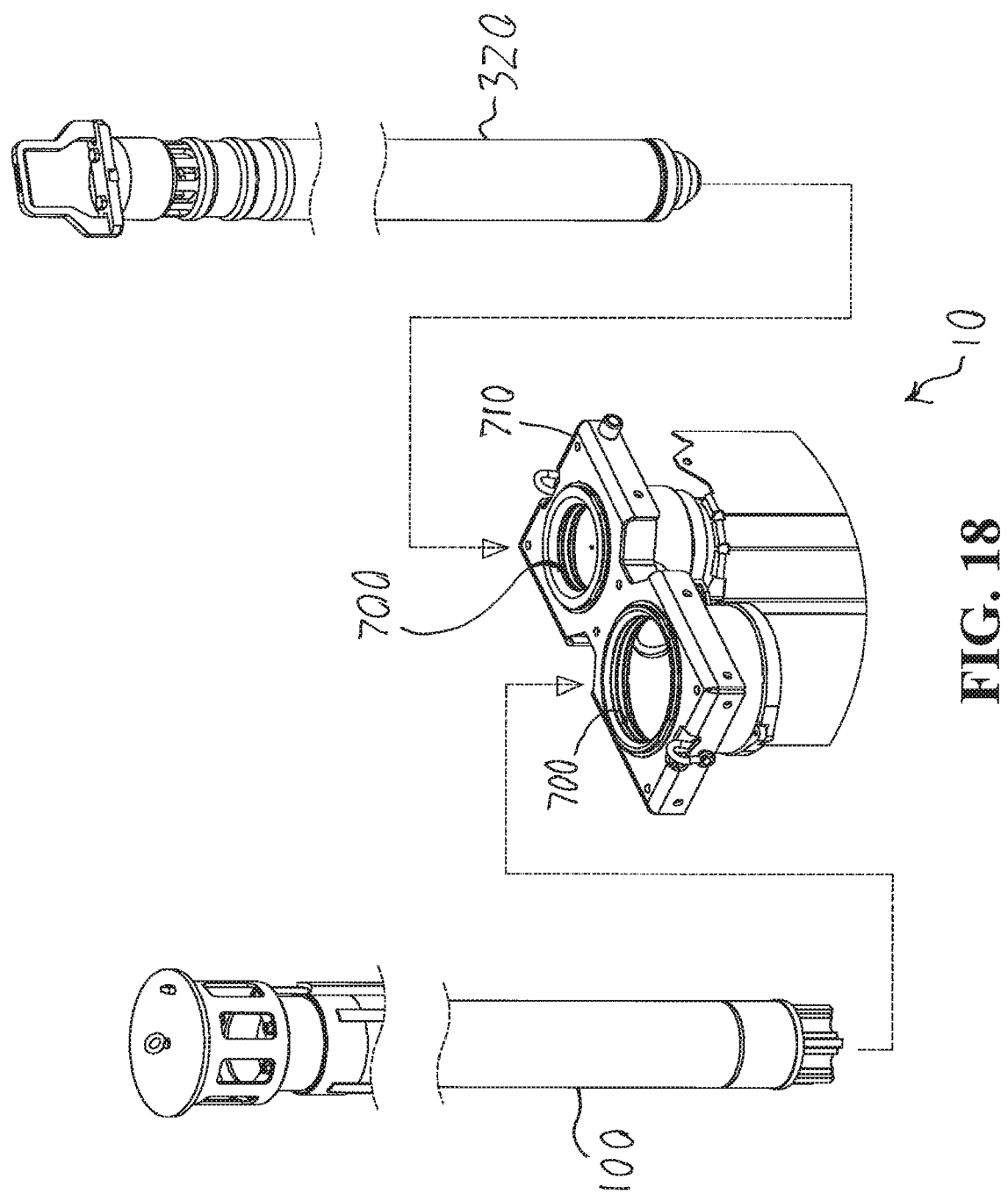
FIG. 18 is a perspective, partial view showing the use of an intermediary adapter for interconnecting modules of the system shown in FIG. 1.

According to various embodiments, as shown in FIG. 18, air-operated radial seals 700 may be provided at the inlets and/or outlets of any one, several, and/or all of the modules (e.g., modules 100, 250, 270, 300, 320, 340, 350) to discourage or prevent contaminants within a module from escaping when modules are disconnected from each other.

According to various embodiments, the interconnections between two or more of the modules in the system 10 may be accomplished by means of intermediary adapters (e.g., manifolds, receivers, or similar structures). This is illustrated in FIG. 18, in which a pump module 100 and filter module 320 are depicted interfacing with an intermediate receiver assembly 710 incorporating inflatable radial seals 700. This kind of intermediary adapter 710 can be especially useful in separating radiation sensitive items like inflatable radial seals 700 from the individual modules that may have high dose rates and are difficult to service or would otherwise degrade in the fuel storage rack radiation field.

The connectors at the inlets and outlets may be remotely engageable male/female connectors that facilitate the connection and disconnection of the various modules while the modules remain underwater in the pool 30. According to various embodiments, once a module is placed into service in the pool 30, the module may remain in the pool and/or underwater for an extended period of time (e.g., through multiple discrete uses of the system 10, over a time period that spans at least two plant 20 down times (e.g., refueling outages), over the entire useful service life of the module, until the module is transferred into a cask and out of the plant 20, etc.).

FIGS. 1 and 11-14 illustrate several non-limiting arrangements of various modules.

According to various embodiments, non-used modules may be stored in the pool's storage rack 410.

According to various alternative embodiments, some (or all) of the modules and/or intermediary adapters may omit standardized connectors/interfaces, and instead rely on connection-specific interfaces.

Module Handling

According to various embodiments, one, several, and/or all of the modules (e.g., modules 100, 250, 300, 320, 340, 350) may have a form factor and/or attachment surfaces/features that are similar enough to a nuclear fuel assembly used in the plant 20 that (1) the plant's fuel assembly handling equipment may be used to hold and move the modules in a similar manner as the plant's equipment is used to do so with actual fuel assemblies, (2) the plant's fuel assembly handling equipment may be used to move the modules relative to each other to form different combinations of purification arrangements, (3) the plant's fuel assembly handling equipment may be used to move the modules to different locations requiring water purification using the plant's existing fuel transfer equipment (e.g., between the spent fuel pool and reactor cavity in a Westinghouse PWR, or between the upper and lower pool in a GE BWR-6), (4) the modules may be stored in spent fuel racks 410 (see FIG. 1) in the fuel pool 30 for extended periods, and/or (5) the modules may ultimately be disposed of in casks or other containers designed for high level radioactive waste and/or spent fuel assemblies used in the plant 20. For example, once a filter module 320 is filled with collected particulates/debris/contaminants, it may be moved to the fuel rack 410 and stored there for an extended time until the module 320 is transferred to a fuel assembly cask for long-term storage.

According to various embodiments, one or more of these design features allows one or more of these water processing modules to remain underwater during storage, transport, and use, which reduces radiation exposure to workers. For example, as shown in FIG. 1, according to various embodiments, all of the modules 100, 250, 300, 320, 340, 350 remain underwater during storage, transport, and use. Additionally, storing these modules in the spent fuel pool 30 for extended periods allows radioactive waste processing activities to be significantly deferred, which improves radioactive waste management economics and simplifies waste management logistics. Specifically, contaminants are easier to manage after an extended storage period due to radioactive decay, and filter disposal activities can be combined with other waste management activities completed as part of plant decommissioning or transfer of radioactive waste (e.g., spent fuel assemblies) to dry casks or other storage containers.

According to various embodiments, one, some, or all of the modules may have form factors that do not coincide with the form factors of the fuel assemblies used in the plant 20. For example, according to various embodiments, the pump module 100 may have a shape and form factor that differs significantly from that of the fuel assemblies used in the plant 20.

Similarly, one, some, or all of the modules may have attachment surfaces/features that do not facilitate grasping and/or moving via the plant's standard fuel assembly handling equipment. In such embodiments, adaptors may be used to facilitate use of the plant's fuel assembly handing equipment with various modules. Additionally and/or alternatively, the system 10 may include system 10—specific module handling and moving equipment that is specifically shaped and configured to connect to and move various modules. Such equipment may include mechanisms for selectively attaching and/or detaching modules from/to each other.

Use of the System 10

According to various non-limiting embodiments, the system 10 is used for general high-flow, high-capacity filtration and purification for removing one or more of the following contaminants from large volumes of water such as spent fuel pools 30 and reactors/reactor cavities:
  i) particulate, ionic or colloidal corrosion products to improve radiological conditions and water clarity;
  ii) silica to improve water clarity and prevent silica ingress into reactor water;

iii) dissolved gases to establish oxidizing/reducing conditions;
iv) nanobubbles which may otherwise degrade water clarity; and/or
v) radioactive gases (e.g., following a fuel leak) which may otherwise be inhaled by workers and lead to internal exposure.

According to various non-limiting embodiments, the system 10 is used for local vacuuming of corrosion product particulate from specific locations, including those from which high activity objects/particles may be present or created. This includes, for example, vacuuming from BWR guide tubes, BWR reactor vessel bottom head drain nozzle, BWR torus, BWR suppression pool, horizontal surfaces in spent fuel pools, reactors/reactor cavities, cask loading pits, and/or under fuel travel path during defueling/refueling activities.

According to various non-limiting embodiments, the system 10 is used for local vacuuming associated with Foreign Object Search and Retrieval (FOSAR) activities or other debris recovery activities in which capture and examination of the object is desired.

According to various non-limiting embodiments, the system 10 is used to generally clean and filter bulk pool 30 water to improve water clarity and/or reduce activity within the pool water.

According to various non-limiting embodiments, the system 10 is used for ultrasonically-enhanced cleaning/vacuuming of debris/particulate that is (1) present in local cavities or (2) created during cleaning of surfaces such as reactor vessel welds that need to be periodically inspected.

In the illustrated arrangements, the system 10 discharges clean, filtered water out of the outlets 300d, 320b, 340b, and/or 350b back into the fuel pool 30. However, any one or more of these filtered water outlets 300d, 320b, 340b, and/or 350b may alternatively connect, either directly or through other intervening modules, to a supply conduit or conduits for supplying clean filtered water to a work area where it is advantageous to keep dose rates low. Thus, according to various non-limiting embodiments, the system 10 is used as a clean water discharge fixture for local delivery of clean, purified, less-active water to specific locations. According to various embodiments, the system 10 may be used to (1) provide a clean water discharge and positive water pressure to the reactor of the plant 20 to limit ingress of silica or other contaminants and/or improve reactor water chemistry control, (2) direct clean water around the BWR "bath tub" to reduce contamination settling on surfaces near workers and limit radiological exposure (e.g., during reactor services performed during refueling outages), and/or (3) direct clean water toward the fuel pool 30 surface to improve water clarity and/or limit radiological exposure via activity near the surface of the water in the pool 30.

According to various non-limiting embodiments, the system 10 is used for collection of machining fines created during (1) repairs at operating plants, such as baffle bolt repairs, in order to ensure foreign metal exclusion (FME) from plant systems, and/or (2) underwater segmentation of reactor vessel and vessel internals during decommissioning of the plant 20 to maintain water clarity.

According to various non-limiting embodiments, the system 10 is used to prevent or discourage algae blooms (e.g., via a UV light module) in spent fuel pools 30 during plant decommissioning activities.

As used here, the terms contaminants, particulate(s), dirt, debris, and similar terms are used interchangeably.

The foregoing illustrated embodiments are provided to illustrate the structural and functional principles of various embodiments and are not intended to be limiting. To the contrary, the principles of the present invention are intended to encompass any and all changes, alterations and/or substitutions thereof (e.g., any alterations within the spirit and scope of the following claims).

What is claimed is:

1. A modular water purification system for a nuclear power plant, the system comprising:
   a plurality of modules that may be selectively connected together in a plurality of arrangements,
   wherein the plurality of modules includes:
      a pump module that includes an inlet and an outlet, and is configured to provide a fluid flow,
      at least two purification modules configured to be interchangeably or simultaneously connected to the pump module, and
      a fuel assembly bottom nozzle cleaning module comprising:
         a receptacle configured to engage a lower nozzle of a fuel assembly of the plant;
         an outlet in fluid communication with an interior of the receptacle, and configured to connect to an inlet of at least one of the plurality of modules so that the pump module causes a water flow that flows sequentially through the fuel assembly in a backwashing direction, into the receptacle, through the outlet of the fuel assembly bottom nozzle cleaning module, and on to the at least one of the plurality of modules; and
         at least one ultrasonic transducer mounted to the receptacle and shaped and configured to direct ultrasonic energy toward a lower nozzle of a fuel assembly that is engaged with the receptacle.

2. The system of claim 1, wherein:
   the at least two purification modules include a foreign object search and retrieval module configured to trap objects larger than 2.5 mm in diameter in a receptacle of the foreign object search and retrieval module, and
   the foreign object search and retrieval module includes an outlet that is configured to be attached to the inlet of the pump module.

3. The system of claim 2, wherein the receptacle is selectively detachable from a remainder of the foreign object search and retrieval module so that objects in the receptacle can be examined.

4. The system of claim 2, wherein the foreign object search and retrieval module is configured to trap objects larger than 1.0 mm in diameter in the receptacle.

5. The system of claim 1, wherein the at least two purification modules include a particulate filtration module comprising filter media that is configured to trap particulates from a flow of fluid through the particulate filtrations module, the particulate filtration module having an inlet that is configured to connect to the outlet of the pump module.

6. The system of claim 5, wherein the filter media comprises radiation tolerant filtration media.

7. The system of claim 5, wherein the at least two purification modules include an electrocoagulation module configured to be positioned upstream from the particulate filtration module so as to coagulate contaminants flowing through the electrocoagulation module before reaching the particulate filtration module and thereby facilitate improved collection of such contaminants by the particulate filtration module.

8. The system of claim 1, wherein the at least two purification modules include a demineralization module that comprises resin and is configured to trap ionic corrosion products from a flow of fluid through the demineralization module.

9. The system of claim 8, wherein the demineralization module includes a fluid outlet that is configured to connect to a solid waste processing system of a nuclear power plant such that spent resin from the demineralization module may be sluiced from the demineralization module to the solid waste processing system.

10. The system of claim 1, wherein the at least two purification modules include a degasification module that includes an extracted gas outlet and is configured to extract gas from a flow of fluid through the degasification module.

11. The system of claim 10, wherein the degasification module is configured to connect to a vacuum pump and a gas waste processing system of the nuclear plant gas so that gas extracted by the degasification module may be handled by the plant's gas waste processing system.

12. The system of claim 1, wherein the at least two purification modules includes a peroxide monitoring and injection module that is configured to discourage the release of corrosion products from fuel assemblies during defueling and refueling activities.

13. The system of claim 1, wherein the at least two purification modules include a cross-flow filtration module that is configured to separate a fluid flow through the cross-flow-filtration module into (1) a relatively cleaner flow of water that exits the cross-flow filtration module via a first outlet, and (2) a relatively dirtier flow that exits the cross-flow filtration module via a second outlet.

14. The system of claim 13, wherein the at least two purification modules include a particulate filtration module with filter media that is configured to trap particulates, the particulate filtration module having an inlet that is configured to alternatively connect to the outlet of the pump module or the second outlet of the cross-flow filtration module.

15. The system of claim 13, wherein:
the at least two purification modules include a degasification module that includes an extracted gas outlet, and
the degasification module comprises a fluid inlet that is configured to be connected to the first outlet of the cross-flow filtration module.

16. The system of claim 15, wherein the extracted gas outlet is configured to connect to a vacuum pump and a gas waste processing system of the nuclear plant gas so that gas extracted by the degasification module may be handled by the plant's gas waste processing system.

17. The system of claim 1, wherein the at least two purification modules comprise first and second purification modules, wherein the first and second purification modules comprise, respectively, different ones of the following purification modules:
a foreign object search and retrieval module configured to trap objects larger than 2.5 mm in diameter in a receptacle of the foreign object search and retrieval module;
a particulate filtration module comprising filter media that is configured to trap particulates;
an electrocoagulation module configured to coagulate contaminants;
a demineralization module that comprises resin and is configured to trap ionic corrosion products;
a degasification module that includes an extracted gas outlet and is configured to extract gas;
a peroxide monitoring and injection module that is configured to discourage the release of corrosion products from fuel assemblies during defueling and refueling activities; or
a cross-flow filtration module that is configured to separate a flow through the cross-flow filtration module into (1) a relatively cleaner flow of water that exits the cross-flow filtration module via a first outlet, and (2) a relatively dirtier flow that exits the cross-flow filtration module via a second outlet.

18. The system of claim 17, wherein the at least two purification modules comprises a third purification module that is selected from the purification modules listed in claim 17 and is different than the first and second purification modules.

19. The system of claim 18, wherein the at least two purification modules comprises a fourth purification module that is selected from the purification modules listed in claim 17 and is different than the first, second, and third purification modules.

20. The system of claim 1, wherein an inlet or an outlet of a plurality of the modules includes a standardized connector to facilitate connection of at least a plurality of the modules to each other in the plurality of arrangements.

21. The system of claim 20, wherein the inlets and outlets of a plurality of the modules include air-operated radial seals that are configured to discourage contaminants within their respective module from escaping when the module is disconnected from another module.

22. The system of claim 20, further comprising at least one intermediary adapter that interconnects an inlet of at least one of the plurality of modules with an outlet of at least one other of the plurality of modules, wherein the at least one intermediary adapter comprises a radiation sensitive item.

23. The system of claim 1, wherein the pump comprises:
a casing that forms an impeller chamber having an inlet and an outlet;
a driveshaft that is connected to the casing for rotation relative to the casing, a gap being formed between the driveshaft and the casing; and
an impeller connected to the driveshaft for rotation with the driveshaft relative to the casing,
wherein the impeller comprises a first set of at least one vane and a second set of at least one vane,
wherein the driveshaft and second set are disposed on an opposite axial side of the impeller as the first set,
wherein the first set of at least one impeller vane are shaped and configured to provide a first flow from the inlet of the casing to the outlet of the casing,
wherein the second set of at least one impeller vane are shaped and configured to provide a second flow from the gap to the outlet of the casing,
wherein the first and second sets are shaped and configured such that during use of the pump, the first flow has a higher flow rate than the second flow, and
wherein the first and second sets are shaped and configured such that during use of the pump, the first flow has a lower pressure than the second flow.

24. A method of using a modular water purification system as recited in claim 1, the method comprising:
interconnecting the pump module with at least one of the at least two purification modules to create at least one flow path therethrough;
positioning the interconnected modules underwater in a fuel pool of the nuclear power plant, either before or after said interconnecting; and operating the pump so as to cause at least one flow of water through the interconnected modules, thereby purifying water passing through the interconnected modules.

25. The method of claim 24, wherein:

the at least one of the at least two purification modules includes a particulate filtration module with filter media that is configured to trap particulates, the particulate filtration module having an inlet that is configured to connect to the outlet of the pump module; and the method further comprises, after said operating, moving the particulate filtration module to a fuel assembly storage rack in the fuel pool.

26. The method of claim 24, wherein:

the at least one of the at least two purification modules includes a cross-flow filtration module;

the operating causes the cross-flow filtration module to separate an incoming flow into (1) a relatively cleaner flow of water that exits the cross-flow filtration module via a first outlet, and (2) a relatively dirtier flow that exits the cross-flow filtration module via a second outlet.

27. The method of claim 26, wherein the operating causes the relatively dirtier flow to vent back into the fuel pool.

28. The system of claim 22, wherein the radiation sensitive item comprises a seal.

29. The system of claim 1, wherein one of the modules comprises an ultraviolet purification module that includes a UV light.

* * * * *